(12) United States Patent
Taleb et al.

(10) Patent No.: US 8,315,238 B2
(45) Date of Patent: Nov. 20, 2012

(54) NETWORK PROCESSING NODE AND METHOD FOR MANIPULATING PACKETS

(75) Inventors: Anisse Taleb, Kista (SE); Stefan Bruhn, Sollentuna (SE); Moo Young Kim, Djursholm (SE); Ingemar Johansson, Luleå (SE); Stefan Häkansson, Luleå (SE); Klas Fredrik Janis Jansson, Sundbyberg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/195,315

(22) Filed: Aug. 1, 2011

(65) Prior Publication Data

US 2011/0292924 A1 Dec. 1, 2011

Related U.S. Application Data

(63) Continuation of application No. 11/275,325, filed on Dec. 22, 2005, now abandoned.

(51) Int. Cl.
*H04W 4/00* (2009.01)

(52) U.S. Cl. ........................................ 370/338

(58) Field of Classification Search .................. 370/338, 370/252, 235; 709/224, 227
See application file for complete search history.

(56) References Cited

U.S. PATENT DOCUMENTS

| | | | |
|---|---|---|---|
| 7,274,711 B2 | 9/2007 | Kajizaki et al. | |
| 2001/0041981 A1* | 11/2001 | Ekudden et al. | 704/270.1 |
| 2007/0147314 A1 | 6/2007 | Taleb et al. | |

FOREIGN PATENT DOCUMENTS

| | | | |
|---|---|---|---|
| EP | 1 104 141 | * | 5/2001 |
| JP | H08-130541 A | | 5/1996 |
| JP | 2002-344515 (A) | | 11/2002 |
| JP | 2004-015551 A | | 1/2004 |
| JP | 2005-065100 A | | 3/2005 |

* cited by examiner

*Primary Examiner* — Michael Faragalla

(57) ABSTRACT

A network processing node (e.g., MGW, MRFP) and method are described herein that can: (1) receive packets on a first heterogeneous link (e.g., wireless link); (2) manipulate the received packets based on known characteristics about a second heterogeneous link (e.g., "Internet" link); and (3) send the manipulated packets on the second heterogeneous link (e.g., "Internet" link). For example, the network processing node can manipulate the received packets by adding redundancy, removing redundancy, frame aggregating (re-packetizing), recovering lost packets and/or re-transmitting packets.

16 Claims, 8 Drawing Sheets

NETWORK PROCESSING NODE AND METHOD FOR MANIPULATING PACKETS

CROSS-REFERENCE TO RELATED APPLICATIONS

This application is a continuation of U.S. application Ser. No. 11/275,325, filed Dec. 22, 2005 now abandoned, the disclosure of which is incorporated herein by reference.

BACKGROUND OF THE INVENTION

1. Field of the Invention

The present invention relates to the communications field and, in particular, to a network processing node (e.g., MGW, MRFP) and method that can: (1) receive packets on a first heterogeneous link (e.g., wireless link); (2) manipulate the received packets based on known characteristics about a second heterogeneous link (e.g., "Internet" link); and (3) send the manipulated packets on the second heterogeneous link (e.g., "Internet" link).

2. Description of Related Art

The following abbreviations are herewith defined, at least some of which are referred to in the ensuing description of the prior art and the preferred embodiments of the present invention.

AMR Adaptive Multi Rate
AS Application Server
BW Bandwidth
BTS Base Transceiver Station
CSCF Call State Control Function
CMR Codec Mode Request
ECU Error Concealment Unit
EGPRS Enhanced General Packet Radio Service
FEC Forward Error Correction
FER Frame Erasure Rate
HSPA High Speed Packet Access
IMS IP Multimedia Subsystem
IP Internet Protocol
LAN Local Area Network
MDC Multiple Description Coding
MGW Media Gateway
MRFP Multimedia Resource Function Processor
NB Narrowband
RTP Real Time Protocol
SID Silence Descriptor
SIP Session Initiation Protocol
TCP Transmission Control Protocol
UE User Equipment
UDP User Datagram Protocol
VoIP Voice over IP
WB Wideband
WCDMA Wideband Code Division Multiple Access
WLAN Wireless LAN In a communications network, channel coding redundancy is often added on top of source data to enable the robust transmission of the source data. In 1948, C. E. Shannon discussed channel coding when he demonstrated that by proper encoding of source data, errors induced by a communication link can be reduced without sacrificing the rate of information transfer. In particular, C. E. Shannon developed a separation theorem which states that source and channel coding can be designed separately to optimize the performance of a communications network assuming a block length is infinite and an entropy rate of the source data is less than the capacity of a time-invariant communications link. For a detailed description about C. E. Shannon's separation theorem, reference is made to the following document:

C. E. Shannon, "A mathematical theory of communications," The Bell System Technical Journal, vol. 27, pp. 379-423 623-656, 1948.

However, an infinite block length causes infinite delay and infinite complexity, which is not feasible in reality. And, communication links may also be time-varying and band-limited especially in a multi-user communication system. Thus, for optimal system design, the source data and channel coding needs to be jointly optimized. This is discussed in the following documents:

S. Vembu, S. Verdé, and Y. Steinberg, "When does the source-channel separation theorem hold?," in Proc. IEEE Int. Symposium Inform. Theory, 27 Jun.-1 Jul. 1994, pp. 198.

S. Vembu, S. Verdú, and Y. Steinberg, "The source-channel separation theorem revisited," IEEE Trans. Inform. Theory, vol. IT-41, no. 1, pp. 44-54, 1995.

K. Sayood, H. H. Otu, N. Demir, "Joint source/channel coding for variable length codes," IEEE Trans. Commun., vol. COM-48, no. 5, pp. 787-794, 2000.

In the last document, K. Sayood et al. classified joint source-channel coding into four classes:

1. Joint source channel coders where source and channel coders are truly integrated (i.e., channel-optimized quantization). A detailed discussion about channel-optimized quantization is provided in the following document: R. M. Gray and D. L. Neuhoff, "Quantization," IEEE Trans. Inform. Theory, vol. 44, no. 6, pp. 2325-2383, 1998.

2. Concatenated source channel coders where source and channel coders are cascaded and fixed total rates are divided into source and channel coders according to the channel condition (i.e., forward error correction (FEC)). A detailed discussion about FEC is provided in the following document: B. Sklar and F. J. Harris, "The ABCs of linear block codes," IEEE Signal Processing Magazine, vol. 21, no. 4, pp. 14-35, 2004.

3. Unequal error protection where more bits are allocated to more important parts of the source data (i.e., uneven level protection). A detailed discussion about uneven level protection is provided in the following document: Li, F. Liu, J. Villasenor, J. Park, D. Park, and Y. Lee, "An RTP payload format for generic FEC with uneven level protection," Internet Draft draft-ietf-avt-ulp-04.txt, Feb. 2002.

4. Constrained source-channel coding where source encoders and decoders are modified depending on the channel condition (i.e., multiple description coding (MDC)). A detailed discussion about MDC is provided in the following documents: (1) A. El Gamal and T. M. Cover, "Achievable rates for multiple descriptions," IEEE Trans. Inform. Theory, vol. IT-28, no. 6, pp. 851-857, 1982; (2) V. A. Vaishampayan, "Design of multiple description scalar quantizer," IEEE Tran. Inform. Theory, vol. 39, no. 3, pp. 821-834, May 1993; and (3) V. K. Goyal, "Multiple description coding: compression meets the network," IEEE Signal Processing Magazine, vol. 18, no. 5, pp. 74-93, September 2001.

In the past, joint source-channel coding has been successfully used in a homogeneous communications network (e.g., wireless link). It would be desirable to be able to efficiently implement joint-source channel coding in a heterogeneous communications network (e.g. wireless link merged with the Internet). Unfortunately, today the use of joint-source channel coding in a heterogeneous communications network is not very efficient as is discussed below with respect to FIGS. 1-3.

Referring to FIG. 1, there is a block diagram illustrating the basic components of an exemplary heterogeneous communications network 100. As shown, UE-1 102 (mobile unit 102) interacts via a wireless link 104 (channel A) with a BTS-1 106. The BTS-1 106 is connected to a MRFP-1 108 which is connected to a MRFP-2 110 via a link 112 (channel B) within the Internet 114. The MRFP-2 110 is connected to a BTS-2 116 which interacts via a wireless link 118 (channel C) with UE-2 120 (mobile unit 120). In this heterogeneous communications network 100, the characteristics of the three links 104, 112 and 118 are very different. The two wireless links 104 and 118 most likely have a reasonable low packet loss rate, especially if radio bearers optimized for real time services are used. On the other hand, the "Internet" link 112 can have a much higher packet loss rate. Unfortunately, today the two UEs 102 and 120 need to add the redundancy to handle the total packet loss rate for all three links 104, 112 and 118. The main drawback of this is that the redundancy added to combat the packet loss on the "Internet" link 112 also needs to be carried over the two wireless links 104 and 118 on which capacity is a scarce resource. This drawback is discussed in more detail below with respect to FIGS. 2 and 3 (PRIOR ART).

Referring to FIGS. 2 and 3 (PRIOR ART), there are respectively illustrated two heterogeneous communications networks 100a and 100b configured like the one shown in FIG. 1 which are used to help describe the main drawback of requiring the UEs 102 and 120 to add the redundancy to handle the total packet loss rate for all three links 108, 112 and 118. In FIG. 2 (PRIOR ART), assume channel A (wireless link 104), channel B ("Internet" link 112), a channel C (wireless link 118) have a FER of 1%, 7% and 1%, respectively. If UE-1 102 sends a packet 200 to UE-2 120, then UE-1 generates source data 202 and also redundancy A, redundancy B and redundancy C. However, redundancy A is only used on channel A and not used on channels B and C. And, redundancy B is only used on channel B and not used on channels A and C. Likewise, redundancy C is only used on channel C and not used on channels A and B. As can be seen, this scheme results in an inefficient use of redundancy transmission.

Referring now to FIG. 3 (PRIOR ART), an alternate solution is shown in which UE-1 102 generates a packet 300 with source data 302 and only one redundancy 304 which is transmitted over channels A, B, and C. In this example, assume that channels A, B, and C have a FER of 1%, 7%, and 1%, respectively. And, assume that UE-1 102 generates the redundancy 304 for the worst case scenario which is 7% in this example and sends it over channels A, B, and C. However, this amount of redundancy does not result in the efficient use of the capacity on the wireless channels A and C. Alternatively, if UE-1 102 generates the redundancy 304 for the average FER case ((1%+7%+1%)/3=3%), then the capacity for the wireless channels A and C will be higher than the previous scenario, but this amount of redundancy is not enough to recover the 7% FER in the channel B. Neither of these scenarios is desirable. Accordingly, there has been and is a need to address this shortcoming by effectively implementing joint-source channel coding (e.g., full redundancy, partial redundancy) in a heterogeneous communications network. This problem and other problems are solved by the present invention.

BRIEF DESCRIPTION OF THE INVENTION

The present invention relates to a network processing node (e.g., MGW, MRFP) that can: (1) receive packets on a first heterogeneous link (e.g., wireless link); (2) manipulate the received packets based on known characteristics about a second heterogeneous link (e.g., "Internet" link); and (3) send the manipulated packets on the second heterogeneous link (e.g., "Internet" link). For instance, the network processing node can manipulate the received packets by adding redundancy, removing redundancy, frame aggregating (re-packetizing the packets), recovering lost packets and/or re-transmitting packets.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

The present invention relates to a network processing node which is placed in a connection path between two UEs (for example) and which is able to manipulate the redundancy (for example) of packets according to its knowledge of the characteristics of it's outgoing link. In the description below, the network processing node (e.g., MRFP) is discussed as being located in an IMS communications network. For instance, in an IMS communications network the two clients (e.g., two UEs) establish a VoIP session (or video telephony session) by using SIP signalling which is sent to a server, e.g. CSCF. The CSCF server then has the possibility to route this signalling to an application server, e.g. AS. The AS ensures that the connection between the two clients (e.g., UEs) is optimized as far as possible and introduces services that can be used before or during the connection. In this scenario, the AS routes all media from the two clients to a network processing node, e.g. MRFP. The MRFP is described below as being able to adapt the redundancy (for example) of incoming streams based on the characteristics of the outgoing connection. For clarity, only the UEs and the MRFPs associated with an IMS communications network are illustrated and described herein. Alternatively, the present invention can be implemented within another type of network processing node besides a MRFP like for example a MGW.

Figure 1:
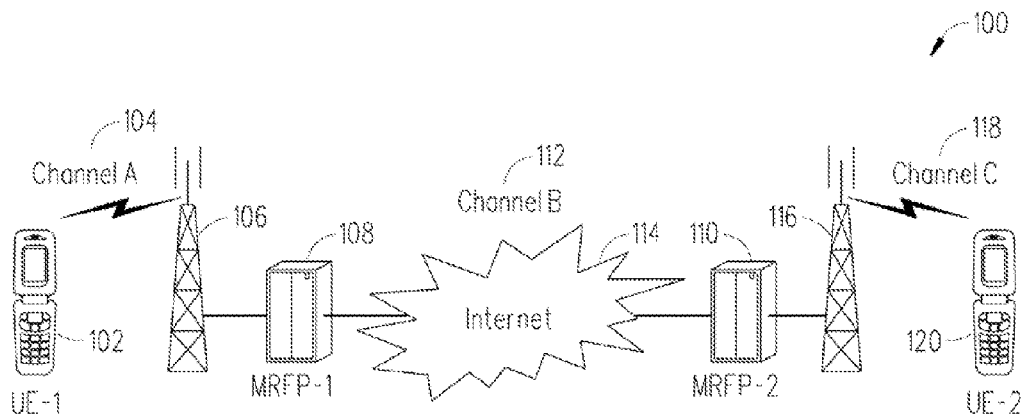
FIG. 1 is a block diagram illustrating the basic components of an exemplary heterogeneous communications network.
Figure 2:
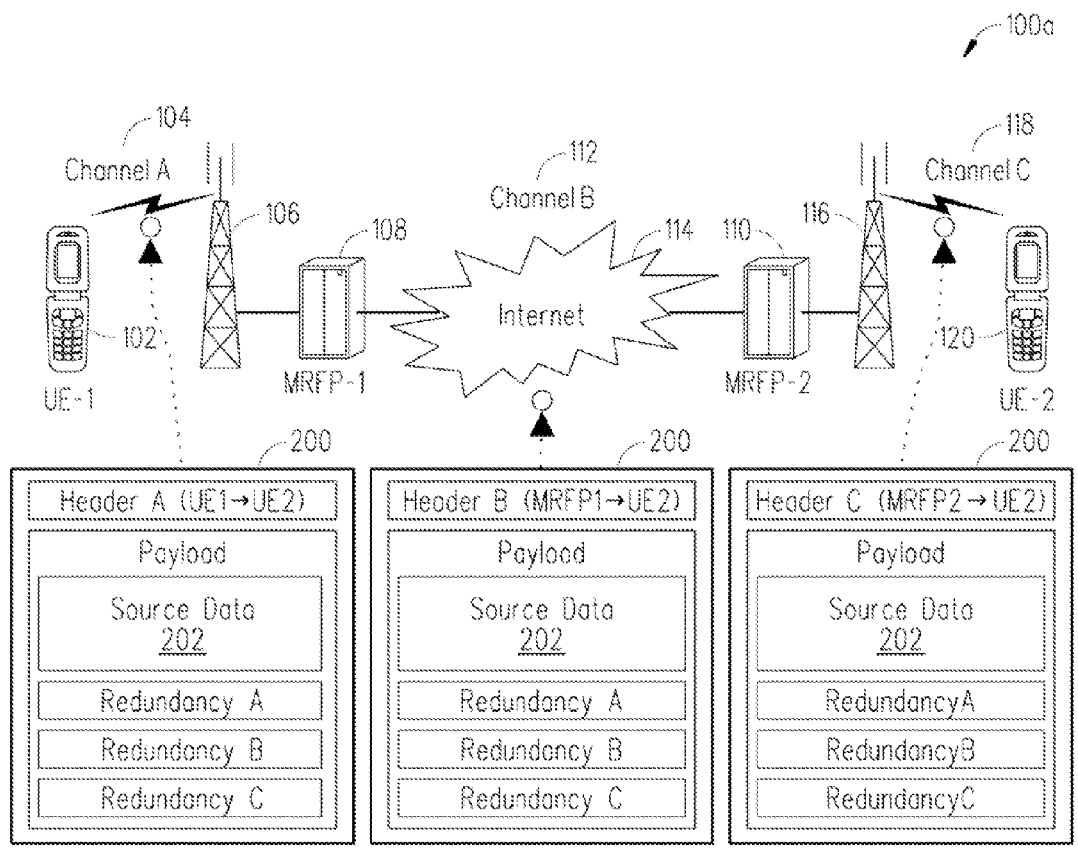
FIG. 2 (PRIOR ART) is a block diagram used to describe one traditional way that two end-points (UE-1 and UE-2) add redundancy to packets transmitted/received within the exemplary heterogeneous communications network shown in FIG. 1.
Figure 3:
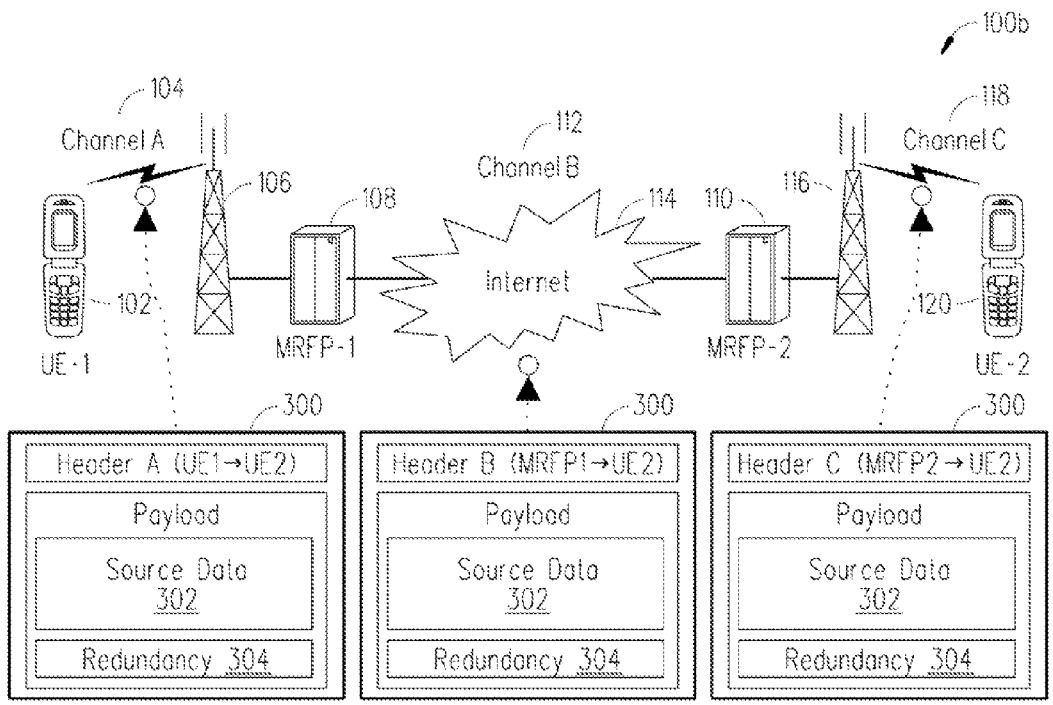
FIG. 3 (PRIOR ART) is a block diagram used to describe another traditional way that two end-points (UE-1 and UE-2) add redundancy to packets transmitted/received within the exemplary heterogeneous communications network shown in FIG. 1.
Figure 4:
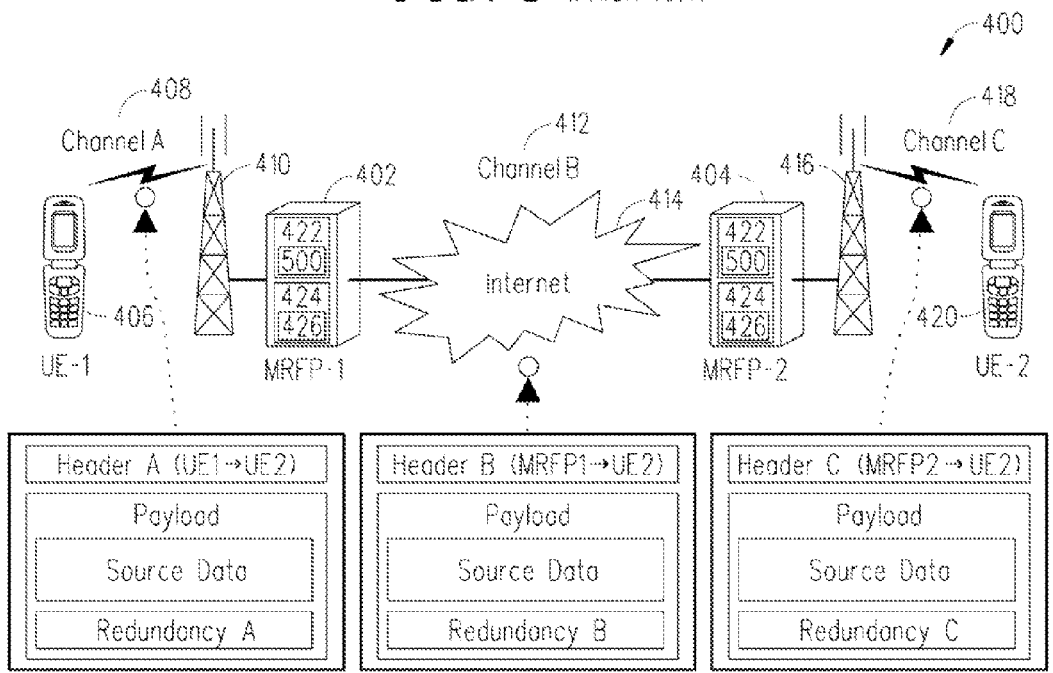
FIG. 4 is a block diagram of an exemplary heterogeneous communications network which has two network processing nodes (e.g., MRFP-1 and MRFP-2) each of which is configured to implement a method in accordance with the present invention.

Referring to FIG. 4, there is a block diagram of an exemplary IMS communications network 400 which has two MRFPs 402 and 404 each of which is configured to implement method 500 in accordance with the present invention. As shown, UE-1 406 (mobile unit 406) interacts via a wireless link 408 (channel A) with a BTS-1 410. The BTS-1 410 is connected to MRFP-1 402 which is connected to MRFP-2 404 via a link 412 (channel B) within the Internet 414. The MRFP-2 404 is connected to a BTS-2 416 which interacts via a wireless link 418 (channel C) with UE-2 420 (mobile unit 420). In this exemplary IMS communications network 400, the characteristics of the three links 408, 412 and 418 are very different. The two wireless links 408 and 418 most likely have a reasonable low packet loss rate, especially if radio bearers optimized for real time services are used. On the other hand, the "Internet" link 412 can have a much higher packet loss rate. In the past, the two UEs 406 and 420 would have been required to add IP level redundancy tailored to handle the total packet loss rate for all three links 408, 412 and 418 (see FIGS. 2 and 3). This scheme resulted in an inefficient use of the redundancy transmission. As described below, the MRFPs 402 and 404 of the present invention tailor the IP level redundancy to the different links in a connection path in an individual fashion which is more efficient than adding the redundancy in the end points (the UEs 406 and 420). The MRFPs 402 and 404 can also manipulate the incoming packets in other ways in addition to (or besides) manipulating the redundancy.

Figure 5:
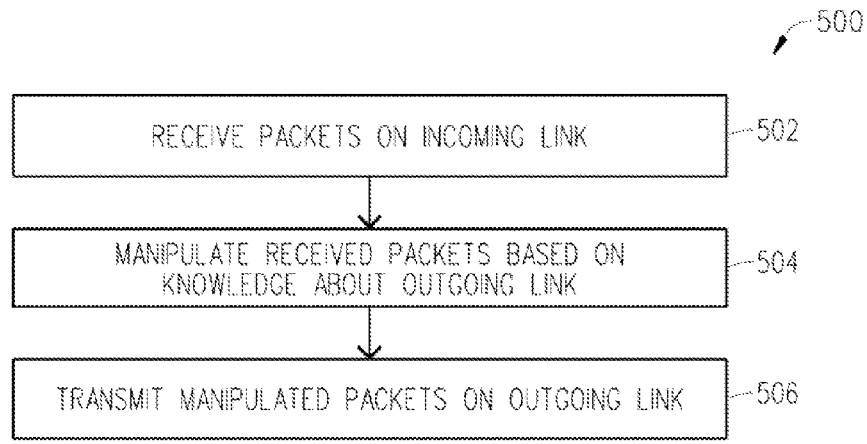
FIG. 5 is a flow diagram that illustrates the basic steps of a method for manipulating packets in accordance with the present invention.

Each MRFP 402 and 404 includes a processor 422, a memory 424 and instructions 426 which are accessible from the memory 424 and processable by the processor 422 to implement method 500 shown in FIG. 5. Basically, MRFP-1 402 can implement method 500 by: (1) receiving packets on an incoming link 408 (see step 502); (2) manipulating the received packets based on known characteristics about an outgoing link 412 (see step 504); and (3) sending the manipulated packets on the outgoing link 412 (see step 506). Likewise, MRFP-2 404 can implement method 500 by: (1) receiving packets on an incoming link 412 (see step 502); (2) manipulating the received packets based on known characteristics about an outgoing link 418 (see step 504); and (3) sending the manipulated packets on the outgoing link 418 (see step 506). Of course, both MRFPs 402 and 404 do not need to implement method 500.

Each MRFP 402 and 404 is able to manipulate their received packets by adding redundancy, removing redundancy, frame aggregating/re-packetizing, recovering lost packets and/or re-transmitting packets. An example of redundancy manipulation is shown in FIG. 4, where UE-1 406 generates header A and redundancy A for channel A (wireless link 408), MRFP-1 402 generates header B and redundancy B for channel B ("Internet" link 412), and MRFP-2 404 generates header C and redundancy C for channel C (wireless link 418). The reverse way can be performed within UE-2 420, MRFP-2 404, and MRFP-1 402 so UE-2 420 can communicate to UE-1 406. As can be seen, each communication channel A, B and C only transmits the corresponding header and needed redundancy. A more detailed discussion about the different types of manipulation that can be performed by MRFPs 402 and 404 are described below with respect to FIGS. 8 and 12.

Figure 6:
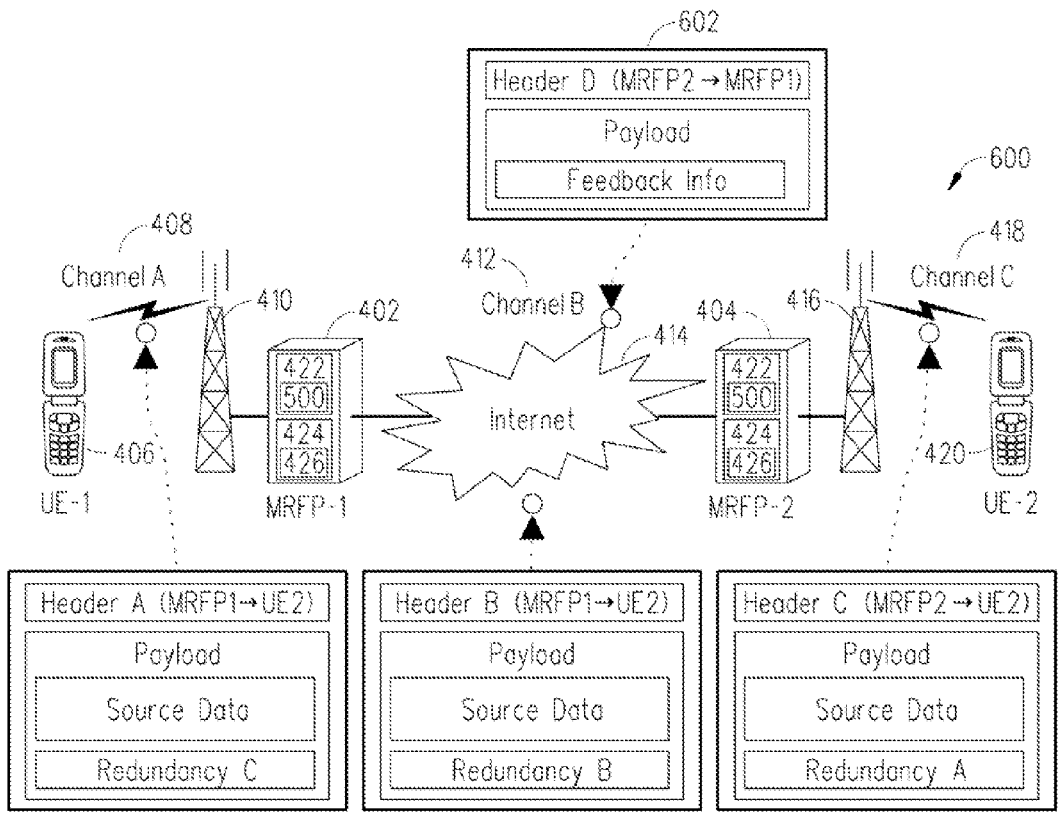
FIG. 6 is a block diagram of an exemplary heterogeneous communications network which is used to explain how one network processing node (e.g., MRFP-2) can send feedback information about the characteristics of a link to another network processing node (e.g., MRFP-1) in accordance with the present invention.

So, each MRFP 402 and 404 can properly manipulate the incoming packets they need to have knowledge about the characteristics (quality, capacity) of their respective outgoing links 412 and 418 (channels B and C). In one embodiment, this knowledge can be adaptive in which case MRFP-1 402 and MRFP-2 404 can share feedback information about packet loss etc . . . related to their shared channel B so they can determine the required level of redundancy (for example). A scenario in which MRFP-2 404 is sending feedback information 602 to MRFP-1 402 is shown in FIG. 6. An advantage of this feature is that the feedback information 602 does not have to be communicated between the UEs 406 and 420.

Figure 7:
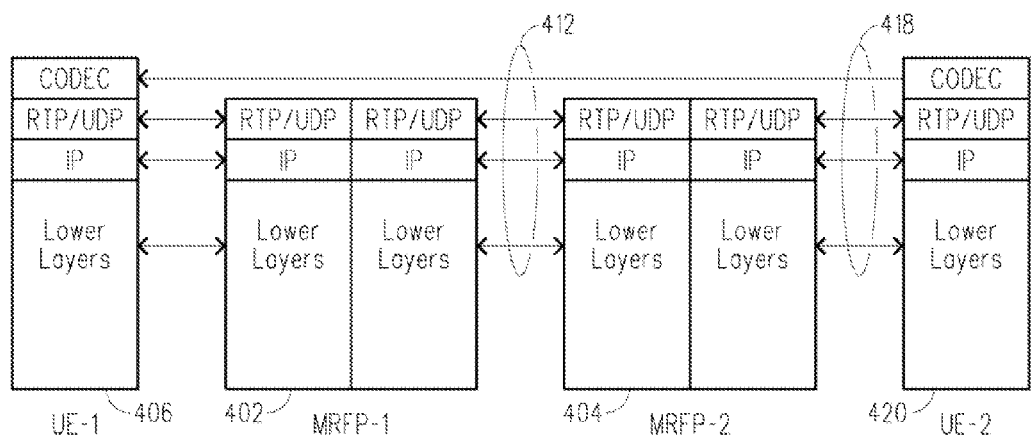
FIG. 7 is a diagram that illustrates exemplary protocol stacks used by a UE-1, MRFP-1, MRFP-2 and UE-2 associated with the exemplary heterogeneous communications network shown in FIG. 4 in accordance with the present invention.

Referring to FIG. 7, there is a diagram illustrating in greater detail some exemplary protocol stacks that can be associated with UE-1, MRFP-1, MRFP-2 and UE-2 in the IMS communications network 400 shown in FIG. 4. This layered protocol architecture is shown to illustrate that the MRFPs 402 and 404 can manipulate the channel coding for example by adding/removing redundancy to the packets within a higher protocol layer (e.g., RTP/UDP, or any higher protocol layer that is standardized in the future). In particular, the MRFPs 402 and 404 can perform the redundancy manipulation (and not necessarily the other types of manipulation like frame aggregation and recovery of lost frames) in the higher protocol layer based on their knowledge of the characteristics of their respective outgoing links 412 and 418.

As shown, UE-1 and UE-2 each have a protocol stack which includes at least the following layers:

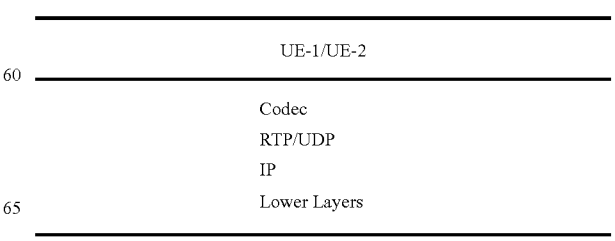

And, MRFP-1 402 and MRFP-2 404 each have a protocol stack which includes at least the following layers:

| MRFP-1/MRFP-2 |
|---|
| RTP/UDP |
| IP |
| Lower Layers |

It should be understood that many of the details associated with each protocol are well known to those skilled in the art and as such are not described in detail herein.

In the following sections, different scenarios are described to illustrate how a network processing node (e.g., MRFP-1 402) can manipulate packets which are received and sent on two different types of communication links (e.g., links 408 and 412). Although, the network processing node described herein is an interface between a wireless link and an "Internet" link it could for instance be an interface between a wireless packet switched network (e.g. HSPA) with little packet loss and strict requirements on transmission efficiency and a wireline LAN with a higher probability of packet loss but lower requirements on transmission efficiency. In addition, the network processing node could interface several other heterogeneous communication links, such as (for example):

- wireless link and wireless link with different characteristics.
- wireline link and wireline link with different characteristics.
- wireless link and wireline link with different characteristics.
- WCDMA DCH link and WCDMA HSPA link.
- GPRS link and EGPRS link.
- EGPRS link and LAN link.
- WCDMA DCH link and LAN link.
- HSPA link and ADSL link.
- EGPRS link and WLAN link.
- etc . . .

As can be seen, the two links (channels) described herein have different characteristics (e.g., with respect to packet loss). It can also be seen that the present invention is not limited to a first link and a second link which happen to be different types of channels. For instance, the present invention also works when the first link and the second link are the same type of channel but with different characteristics.

Again, even though an IMS implementation of the present invention is described herein where a MRFP manipulates the incoming packets, it should be appreciated that any type of network processing node that can handle a connection between two heterogenous links can also implement the same functionality. It should also be noted that in the description below if encryption of the payload is not mentioned explicitly then it is assumed that it is not used or that it can be handled by the MRFP. The examples below also assume that AMR/AMRWB codecs are being used but other types of codecs can be applied as well.

Figure 8A:
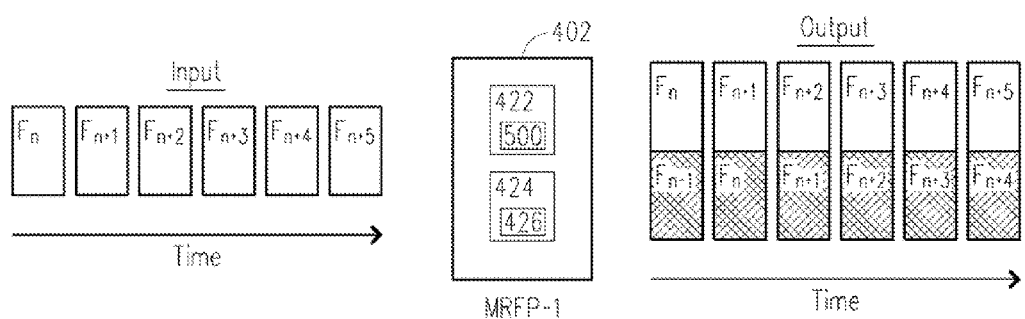
FIGS. 8A and 8B are two block diagrams which are used to help explain how a network processing node (e.g., MRFP-1) can manipulate received packets by adding redundancy to the received packets in accordance with a first embodiment of the present invention.
Figure 8B:
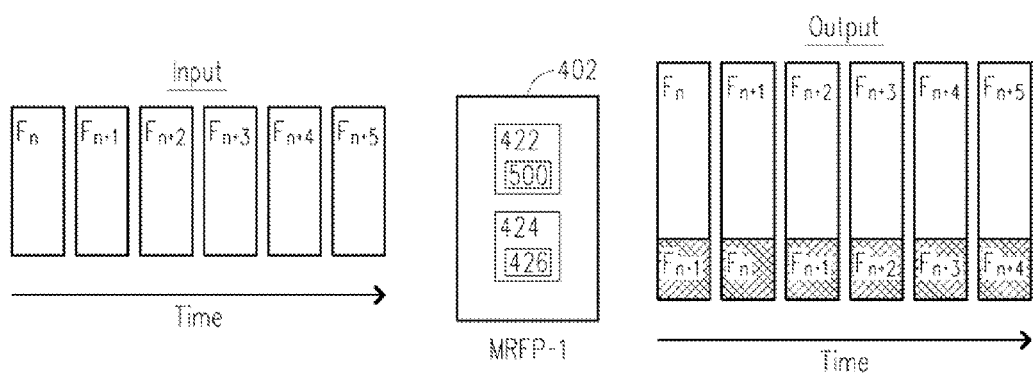

Referring to FIGS. 8A and 8B, there are two diagrams which are used to help explain how the MRFP-1 402 (for example) can manipulate received packets by adding redundancy to the received packets in accordance with a first embodiment of the present invention. In FIG. 8A, the MRFP-1 402 is shown receiving six speech packets $F_n, F_{n+1} \ldots F_{n+5}$ and then outputting six speech packets $F_n/F_{n-1}, F_{n+1}/F_n \ldots F_{n+5}/F_{n+4}$ (where the shaded portions of the outgoing packets are redundancy data). In this example, the MRFP-1 402 adds a full set of data from one previous incoming speech frame/packet to the current outgoing speech frame/packet. Alternatively, the MRFP-1 402 could add a full set of data from more than one of the previous incoming speech frames/packets to the current outgoing speech frame/packet. This type of manipulation is called full redundancy (compare to Sayood's cascade integration coding scheme).

In FIG. 8B, the MRFP-1 402 is shown receiving six speech packets $F_n, F_{n+1} \ldots F_{n+5}$ and then outputting six speech packets $F_n/F_{n'-1}, F_{n+1}/F_{n'} \ldots F_{n+5}/F_{n+4'}$ (where the shaded portions of the outgoing packets are redundancy data). In this example, the MRFP-1 402 adds a partial set of data from one previous incoming speech frame/packet to the current outgoing speech frame/packet. The partial set of data would typically be the most important bits in the payload. In one application, if the received packets are voice frames then the MRFP-1 402 could decode the pitch lags and gains and re-encode them in the partial redundant format. This type of redundancy is called partial redundancy (compare to Sayood's unequal error protection channel coding scheme).

The MRFP-1 402 by performing redundancy manipulation is generally going to cause increase in size of the outgoing stream of packets, the magnitude of which corresponds to the amount of redundancy which is added to the outgoing packet stream. If the MRFP-1 402 used an AMR/AMR-WB speech codec, then it could use a CMR field in the payload to help compensate for the increase in the packet size. The CMR is used to signal which codec mode (i.e. bitrate) the other end point (e.g., UE-1 406) should use to encode their outgoing stream. In particular, if a MRFP-1 402 is adding redundancy and thereby increasing the packet size, then it can manipulate the CMR field sent to the UE-1 406 to indicate that it should use a lower bitrate codec mode on its outgoing stream of packets to compensate for the increase in the packet size.

Figure 9:
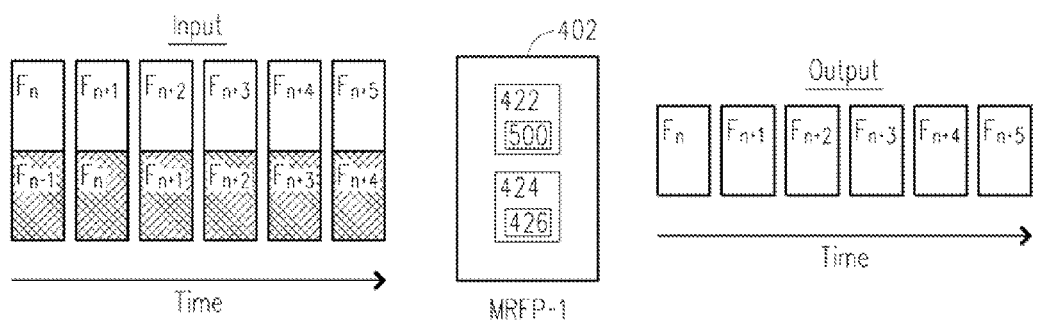
FIG. 9 is a block diagram which is used to help explain how a network processing node (e.g., MRFP-1) can manipulate received packets by removing redundancy from the received packets in accordance with a second embodiment of the present invention.

Referring to FIG. 9, there is a diagram which is used to help explain how the MRFP-1 402 (for example) can manipulate received packets by removing redundancy from the received packets in accordance with a second embodiment of the present invention. In FIG. 9, the MRFP-1 402 is shown receiving six speech packets $F_n/F_{n-1}, F_{n+}/F_n \ldots F_{n+5}/F_{n+4}$ and then outputting six speech packets $F_n, F_{n+} \ldots F_{n+5}$ (where the shaded portions of the incoming packets are redundancy data). In this example, the MRFP-1 402 removes a full set of data from the incoming speech frames/packets (the opposite of what was done in FIG. 8A). Alternatively, the MRFP-1 402 could remove a partial set of data from the incoming speech frames/packets (the opposite of what was done in FIG. 8B). This type of manipulation is called removing redundancy.

Figure 10A:
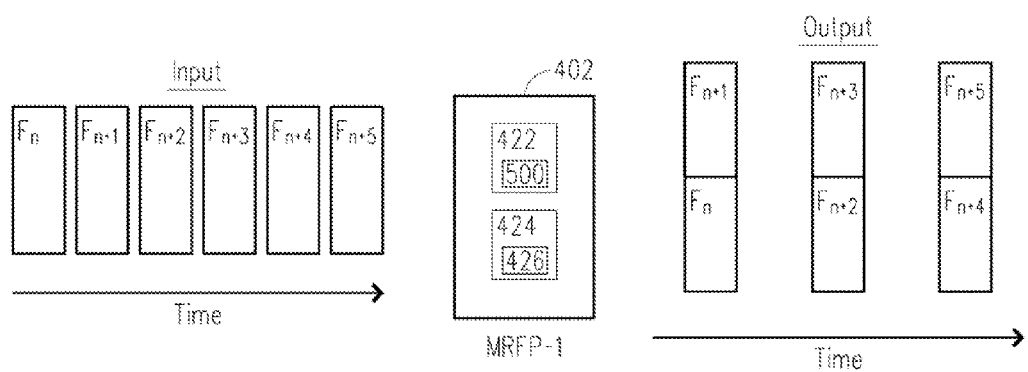
FIGS. 10A and 10B, there are two diagrams which are used to help explain how a network processing node (e.g., MRFP-1) can manipulate received packets by re-packeting them via frame aggregation in accordance with a third embodiment of the present invention.
Figure 10B:
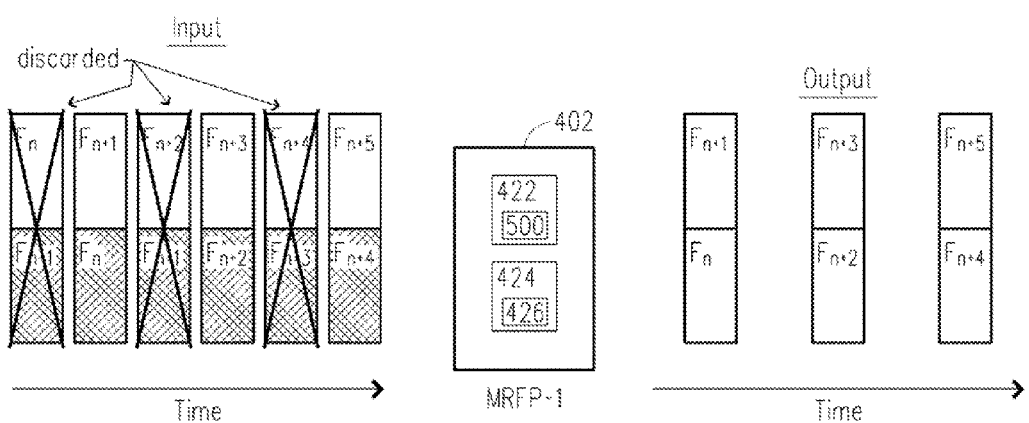

Referring to FIGS. 10A and 10B, there are two diagrams which are used to help explain how the MRFP-1 402 (for example) can manipulate received packets by re-packeting them via frame aggregation in accordance with a third embodiment of the present invention. In FIG. 10A, the MRFP-1 402 is shown receiving five speech packets $F_n, F_{n+1}, F_{n+2}, F_{n+3}, F_{n+4}$ and $F_{n+5}$ and then outputting three re-packetized speech packets $F_{n+1}/F_n, F_{n+3}/F_{n+2}$ and $F_{n+5}/F_{n+4}$. In this example, the MRFP-1 402 manipulates the packetization to obtain higher BW efficiency (at the price of delay). The idea is to reduce the transmitted bit rate by reducing the IP packet rate which in turn reduces the overhead due to IP-headers. In normal transmission, the TCP/IP protocol requires that each packet be tagged with sender and receiver data contained in an IP header. And, in VoIP these IP headers are quite large (~40 bytes) compared to the size of the payload (typically 11 to 40 bytes). Therefore, it may be better to aggregate two or more incoming packets into one outgoing packet as shown in FIG. 10A and thus make the transmission more BW efficient.

An alternative scheme may be needed in the case where the incoming stream of packets to the MRFP-1 402 uses redundancy while the outgoing stream of packets requires BW efficient transmission (re-packetization manipulation) without redundancy. In this case, the MRFP-1 402 may open the received packets and re-packetize the information such that no redundant data is left (or such that the degree of redundancy is changed to another desired degree). Another, possibility which can even be used in the case of encryption, is to discard as many redundant packets as possible such that the receiver (e.g., MRFP-2) is still able to recover all information. FIG. 10B illustrates an example of this particular scheme in which the MRFP-1 402 receives six incoming packets $F_n/F_{n-1}$, $F_{n+1}/F_n$, $F_{n+2}/F_{n+1}$, $F_{n+3}/F_{n+2}$, $F_{n+4}/F_{n+3}$ and $F_{n+5}/F_{n+4}$ and discards as many redundant packets as possible (marked with a cross) which in this case are $F_n/F_{n-1}$, $F_{n+2}/F_{n+1}$ and $F_{n+4}/F_{n+3}$ such that the receiver (e.g., MRFP-2 404) is still able to recover all of the information.

Figure 11A:
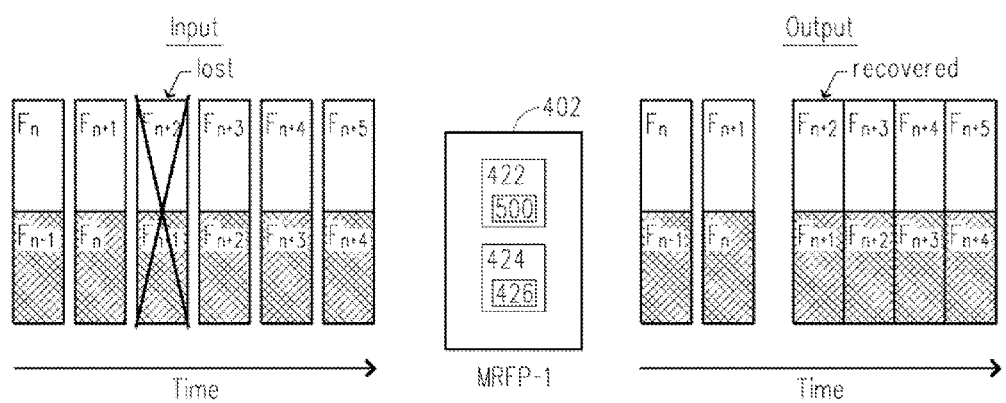
FIGS. 11A and 11B are two block diagrams which are used to help explain how a network processing node (e.g., MRFP-1) can manipulate received packets by recovering a lost packet in accordance with a fourth embodiment of the present invention.
Figure 11B:
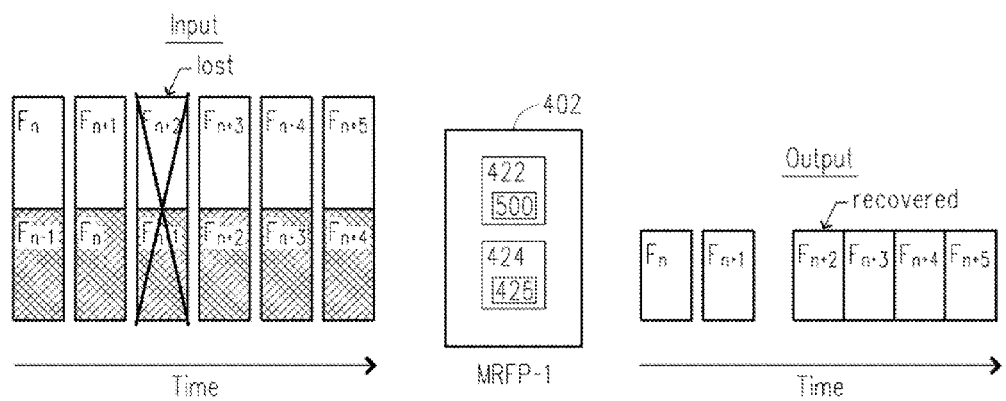

Referring to FIGS. 11A and 11B, there are two diagrams which are used to help explain how the MRFP-1 402 (for example) can manipulate received packets by recovering a lost packet in accordance with a fourth embodiment of the present invention. In FIG. 11A, the MRFP-1 402 is shown receiving five speech packets $F_n/F_{n-1}$, $F_{n+1}/F_n$, $F_{n+3}/F_{n+2}$, $F_{n+4}/F_{n+3}$ and $F_{n+5}/F_{n+4}$ and when packet $F_{n+3}/F_{n+2}$ is received the sequence number will indicate that packet $F_{n+2}/F_{n+1}$ (marked with a cross) has been lost (the shaded portions of the incoming packets are redundancy data). Because, the incoming speech traffic was transmitted with redundancy it is possible to recover one or more lost packet(s) like packet $F_{n+2}/F_{n+1}$. The missing packet can be restored (shown as outgoing packet $F_{n+2}/F_{n+1}$) using the most recent incoming packet $F_{n+3}/F_{n+2}$ and the incoming packet $F_{n+1}/F_n$ that was received prior to noticing their was a missing incoming packet $F_{n+2}/F_{n+1}$. The MRFP-1 402 outputs six packets $F_n/F_{n-1}$, $F_{n+1}/F_n$, $F_{n+2}/F_{n+1}$, $F_{n+3}/F_{n+2}$, $F_{n+4}/F_{n+3}$ and $F_{n+5}/F_{n+4}$ (where the shaded portions of the outgoing packets are redundancy data). This repair action may increase the delay jitter in the transmission path between outgoing packet $F_{n+1}/F_n$ and the recovered outgoing packet $F_{n+2}/F_{n+1}$. As a result, the receiving device (e.g., UE-2) needs to adapt to this situation caused by the delayed jitter. The receiving device should not have a problem adapting to delay jitter if it implements an adaptive jitter buffer algorithm.

In FIG. 11B, an alternative repair scheme is shown in which MRFP-1 402 receives five speech packets $F_n/F_{n-1}$, $F_{n+1}/F_n$, $F_{n+3}/F_{n+2}$, $F_{n+4}/F_{n+3}$ and $F_{n+5}/F_{n+4}$ and when packet $F_{n+3}/F_{n+2}$ is received the sequence number will indicate that packet $F_{n+2}/F_{n+1}$ (marked with a cross) has been lost (the shaded portions of the incoming packets are redundancy data). Because, the incoming speech traffic was transmitted with redundancy it is possible to recover the lost packet $F_{n+2}/F_{n+1}$ using the incoming packets $F_{n+1}/F_n$ and $F_{n+3}/F_{n+2}$. However, in this scheme, MRFP-1 402 does not use redundancy in its outgoing packets which are shown as $F_n$, $F_{n+1}$, $F_{n+2}$ (recovered packet), $F_{n+3}$, $F_{n+4}$ and $F_{n+5}$ (note the delay jitter between packet $F_{n+1}$ and recovered packet $F_{n+2}$). More schemes, can be imagined depending on the incoming stream and the outgoing stream type where, for instance, the incoming stream which is in a repair situation may be "full-redundancy" or "partial redundancy" and the outgoing stream may be "full-redundancy", "partial redundancy", "normal", and/or "BW efficient" etc . . .

Figure 12A:
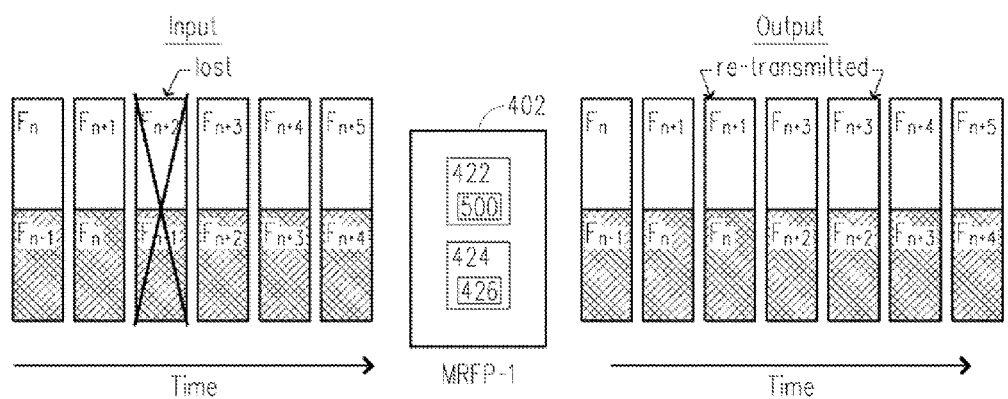
FIGS. 12A and 12B are two block diagrams which are used to help explain how a network processing node (e.g., MRFP-1) can manipulate received packets by transmitting packet(s) more than once to a decoding end (e.g., MRFP-2) when it is not desirable/possible to recover a lost packet in accordance with a fifth embodiment of the present invention.
Figure 12B:
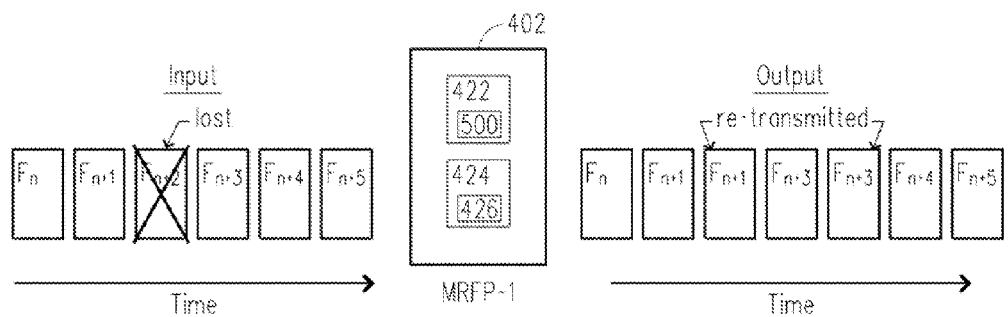

Referring to FIGS. 12A and 12B, there are two diagrams which are used to help explain how the MRFP-1 402 (for example) can manipulate received packets by transmitting packet(s) more than once to a decoding end (e.g., MRFP-2 404) when it is not desirable/possible to recover a lost packet in accordance with a fifth embodiment of the present invention. In FIG. 12A, the MRFP-1 402 is shown receiving five speech packets $F_n/F_{n-1}$, $F_{n+1}/F_n$, $F_{n+3}/F_{n+2}$, $F_{n+4}/F_{n+3}$ and $F_{n+5}/F_{n+4}$ and when packet $F_{n+3}/F_{n+2}$ is received the sequence number will indicate that packet $F_{n+2}/F_{n+1}$ (marked with a cross) has been lost (the shaded portions of the incoming packets are redundancy data). In this scheme, assume the packet repair/recovery is not possible due to encryption (for example) or not desirable for complexity reasons (for example). In principle, it can be argued that, due to redundancy transmission, still no information is lost. However, the onwards transmission is more sensitive to further packet losses. And, to compensate for this situation, the MRFP-1 402 can transmit the packets (or a selection of packets) containing at least parts of the lost packet twice (or more). In this scenario, the MRFP-1 402 transmits the following speech packets $F_n/F_{n-1}$, $F_{n+1}/F_n$, $F_{n+1}/F_n$ (re-transmitted), $F_{n+3}/F_{n+2}$, $F_{n+3}/F_{n+2}$ (re-transmitted), $F_{n+4}/F_{n+3}$ and $F_{n+5}/F_{n+4}$ (where the shaded portions of the outgoing packets are redundancy data).

In FIG. 12B, there is shown a scenario in which the loss of a packet leads to the loss of real information. In this scenario, the MRFP-1 402 is shown receiving five speech packets $F_n$, $F_{n+1}$, $F_{n+3}$, $F_{n+4}$ and $F_{n+5}$ and when packet $F_{n+3}$ is received the sequence number will indicate that packet $F_{n+2}$ (marked with a cross) has been lost. The incoming speech packets did not contain redundancy data and as a result the information in packet $F_{n+2}$ has been lost. As shown, a possible solution to this problem would be to re-transmit at least some of the packets adjacent to the loss. For instance, the MRFP-1 402 could transmit seven speech packets $F_n$, $F_{n+1}$, $F_{n+1}$ (re-transmitted), $F_{n+3}$, $F_{n+3}$ (re-transmitted), $F_{n+4}$ and $F_{n+5}$. An advantage of this re-transmission scheme would be to decrease the risk of losing consecutive packets (e.g., packets $F_{n+1}$ and $F_{n+2}$ or $F_{n+2}$ and $F_{n+3}$) at the decoding end (e.g., UE-2 420). Because, if consecutive packets where lost then this would likely cause substantial quality degradation. Of course, this solution would leave the error concealment to the decoding end (e.g., MRFP-2 404). An alternative solution, relates to recovering as much as possible of the lost information by means of error concealment at the MRFP-1 402 and to transmit this information instead of the lost packet. However, this particular solution may not be desirable because it requires the MRFP-1 402 to execute complex error concealment programs and it also requires that the incoming packets contain non-encrypted information.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A method of transmitting a plurality of data packets from a sending node to a receiving node via a first communication link, an intermediate network processing node, and a second communication link, wherein the first and second communication links have different channel quality characteristics, said method comprising the steps of:

receiving by the intermediate network processing node, the data packets transmitted from the sending node, said packets being received over the first communication link with a first level of redundancy sufficient to achieve a predefined error rate when the packets are received at the intermediate network processing node;

determining by the intermediate network processing node, a second, different level of redundancy required to achieve the predefined error rate when the packets are transmitted to the receiving node over the second communication link, said determining step based on known channel quality characteristics of the second communication link; and transmitting the data packets from the intermediate network processing node to the receiving node over the second communication link with the second, different level of redundancy sufficient to achieve the predefined error rate when the packets are received at the receiving node.

2. The method as recited in claim 1, further comprising the steps of:

receiving feedback information in the intermediate network processing node regarding the channel quality characteristics of the second communication link; and updating the known characteristics of the second communication link utilizing the feedback information.

3. The method as recited in claim 1, wherein the channel quality characteristics of the first communication link are better than the channel quality characteristics of the second communication link, and the determining step includes determining a second, higher level of redundancy required to achieve the predefined error rate when the packets are transmitted to the receiving node over the second communication link.

4. The method as recited in claim 1, wherein the channel, quality characteristics of the first communication link are worse than the channel quality characteristics of the second communication link, and the determining step includes determining a second, lower level of redundancy required to achieve the predefined error rate when the packets are transmitted to the receiving node over the second communication link.

5. The method as recited in claim 1, wherein to achieve the predefined error rate when the packets are transmitted to the receiving node over the second communication link, the intermediate network processing node also performs at least one of the following steps:

aggregating and re-packetizing the packets for transmission on the second communication link;

utilizing redundant data received on the first communication link to recover lost packets; and transmitting recovered packets more than once on the second communication link.

6. An intermediate network processing node for forwarding to a receiving node, a plurality of data packets received from a sending node, wherein the intermediate network processing node communicates with the sending node via a first communication link having first channel quality characteristics, and communicates with the receiving node via a second communication link having second, different channel quality characteristics, said intermediate network processing node comprising:

means for receiving the data packets transmitted from the sending node, said packets being received over the first communication link with a first level of redundancy sufficient to achieve a predefined error rate when the packets are received at the intermediate network processing node;

means for determining a second, different level of redundancy required to achieve the predefined error rate when the packets are transmitted to the receiving node over the second communication link, said determining step based on known channel quality characteristics of the second communication link; and means for transmitting the data packets from the intermediate network processing node to the receiving node over the second communication link with the second, different level of redundancy sufficient to achieve the predefined error rate when the packets are received at the receiving node.

7. The intermediate network processing node as recited in claim 6, further comprising:

means for receiving feedback information in the intermediate network processing node regarding the channel quality characteristics of the second communication link; and means for updating the known characteristics of the second communication link utilizing the feedback information.

8. The intermediate network processing node as recited in claim 6, wherein the channel quality characteristics of the first communication link are better than the channel quality characteristics of the second communication link, and the determining means includes means for determining a second, higher level of redundancy required to achieve the predefined error rate when the packets are transmitted to the receiving node over the second communication link.

9. The intermediate network processing node as recited in claim 6, wherein the channel quality characteristics of the first communication link are worse than the channel quality characteristics of the second communication link, and the determining means includes means for determining a second, lower level of redundancy required to achieve the predefined error rate when the packets are transmitted to the receiving node over the second communication link.

10. The intermediate network processing node as recited in claim 6, wherein to achieve the predefined error rate when the packets are transmitted to the second end node over the second communication link, the intermediate network processing node also includes at least one of:

means for aggregating and re-packetizing the packets for transmission on the second communication link;

packet recovery means for utilizing redundant data received on the first communication link to recover lost packets; and means for transmitting recovered packets more than once on the second communication link.

11. The network processing node as recited in claim 6, wherein the means for receiving and means for transmitting include interfaces selected from a group consisting of:

a wireless link and wireless link with different characteristics, respectively;

a wireline link and wireline link with different characteristics, respectively;

a wireless link and wireline link with different characteristics, respectively;

a WCDMA DCH link and a WCDMA HSPA link, respectively;

a GPRS link and an EGPRS link, respectively;

an EGPRS link and a LAN link, respectively;

a WCDMA DCH link and LAN link, respectively;

an HSPA link and an ADSL link, respectively;

an EGPRS link and a WLAN link, respectively;

a wireless link and an Internet link, respectively;
a wireline link and an Internet link, respectively; or
an HSPA link and a wireline LAN link, respectively.

12. A multimedia resource function processor (MRFP), comprising:
a processor;
a memory accessible by the processor; and
computer program instructions loaded on the memory, said instructions for performing the following steps when run on the processor:
receiving data packets transmitted from a sending node, said packets being received over a first communication link with a first level of redundancy sufficient to achieve a predefined error rate when the packets are received at the MRFP;
determining a second, different level of redundancy required to achieve the predefined error rate when the packets are transmitted from the MRFP to a receiving node over a second communication link having different channel quality characteristics than the first communication link, said determining step based on known channel quality characteristics of the second communication link; and
transmitting the data packets from the MRFP to the receiving node over the second communication link with the second, different level of redundancy sufficient to achieve the predefined error rate when the packets are received at the receiving node.

13. The MRFP as recited in claim 12, wherein the instructions also perform the following steps when run on the processor:
receiving feedback information regarding the channel quality characteristics of the second communication link; and
updating the known characteristics of the second communication link utilizing the feedback information.

14. The MRFP as recited in claim 12, wherein the channel quality characteristics of the first communication link are better than the channel quality characteristics of the second communication link, and the determining step includes determining a second, higher level of redundancy required to achieve the predefined error rate when the packets are transmitted to the receiving node over the second communication link.

15. The MRFP as recited in claim 12, wherein the channel quality characteristics of the first communication link are worse than the channel quality characteristics of the second communication link, and the determining step includes determining a second, lower level of redundancy required to achieve the predefined error rate when the packets are transmitted to the receiving node over the second communication link.

16. The MRFP as recited in claim 12, wherein to achieve the predefined error rate when the packets are transmitted to the receiving node over the second communication link, the instructions also perform the following steps when run on the processor:
aggregating and re-packetizing the packets for transmission on the second communication link;
utilizing redundant data received on the first communication link to recover lost packets; and
transmitting recovered packets more than once on the second communication link.

\* \* \* \* \*

UNITED STATES PATENT AND TRADEMARK OFFICE
CERTIFICATE OF CORRECTION

PATENT NO. : 8,315,238 B2
APPLICATION NO. : 13/195315
DATED : November 20, 2012
INVENTOR(S) : Taleb et al.

Page 1 of 1

It is certified that error appears in the above-identified patent and that said Letters Patent is hereby corrected as shown below:

In Column 2, Line 13, delete "Verdé," and insert -- Verdú, --, therefor.

In Column 5, Line 14, delete "VolP" and insert -- VoIP --, therefor.

In Column 8, Line 11, delete "$F_n/F_{n'-1}$," and insert -- $F_n/F_{n-1'}$, --, therefor.

In Column 8, Line 42, delete "$F_{n+}/F_n$" and insert -- $F_{n+1}/F_n$ --, therefor.

In Column 8, Line 43, delete "$F_{n+}$" and insert -- $F_{n+1}$ --, therefor.

In Column 9, Line 38, delete "their" and insert -- there --, therefor.

In Column 9, Line 51, delete "$F_{n+3}/Fn_{+2}$." and insert -- $F_{n+3}/F_{n+2}$, --, therefor.

In Column 10, Line 29, delete "$F_{n+\,4}$" and insert -- $F_{n+4}$ --, therefor.

In Column 11, Line 37, in Claim 4, delete "channel," and insert -- channel --, therefor.

Signed and Sealed this
Twenty-sixth Day of March, 2013

Teresa Stanek Rea
*Acting Director of the United States Patent and Trademark Office*